United States Patent [19]

Herring, Jr.

[11] 4,062,585
[45] Dec. 13, 1977

[54] VIBRATION ABSORPTION PAD KIT FOR SEAT MOUNTING

[76] Inventor: Arthur J. Herring, Jr., 3 Hunter Ridge Road, Sussex, N.J.

[21] Appl. No.: 681,296

[22] Filed: Apr. 29, 1976

[51] Int. Cl.$^2$ ............................................. B62J 1/00
[52] U.S. Cl. .................................. 297/195; 248/358 R
[58] Field of Search ......... 297/195, 214, 243, DIG. 9; 248/374, 358 R, 22, 15, 20

[56] References Cited

U.S. PATENT DOCUMENTS

| | | | |
|---|---|---|---|
| 742,479 | 10/1903 | Newey | 297/195 |
| 2,196,428 | 4/1940 | Saurer | 248/358 R X |
| 2,303,567 | 12/1942 | McWhorter et al. | 248/374 |
| 2,532,574 | 12/1950 | Schwinn | 248/374 X |
| 2,534,137 | 12/1950 | Lewis | 248/358 R X |
| 3,112,950 | 12/1963 | Jaskowiak | 248/358 R X |
| 3,177,962 | 4/1965 | Bailey | 248/358 R X |
| 3,436,042 | 4/1969 | Goubergen | 248/358 R X |
| 3,712,670 | 1/1973 | Svehla | 297/214 X |
| 3,758,154 | 9/1973 | Kitaguchi | 297/214 |

FOREIGN PATENT DOCUMENTS 2,458,814  6/1975  Germany .................. 248/358 R Primary Examiner—James T. McCall
Attorney, Agent, or Firm—James J. Cannon, Jr.; James J. Cannon

[57] ABSTRACT

An absorption pad kit for the improved mounting of a motorcycle seat to isolate the same from high frequency vibration by the incorporation of a plurality of resilient rubber-type compound pads which interpose juxtaposed seat support frame member interconnections and bolt connections, and further includes a modified seat support member and two bolt extensions. The resilient pads are configured and positioned to attenuate along the direct line of travel, vibrations which are transferred to the seat through seat support frame members normally juxtaposed to a main seat support bar which is connected to the main chassis. The interfacing pads intercept and dampen vibration paths which are normally transferred by rigid frame member interconnections.

4 Claims, 2 Drawing Figures

VIBRATION ABSORPTION PAD KIT FOR SEAT MOUNTING

BACKGROUND OF THE INVENTION

The present invention relates to resilient seat mounting means particularly adapted to motorcycle and tractor seat mountings whereby a plurality of rubber-like pads are placed between rigidly interconnected members to restrict and dampen the transmission path of vibration to the seat.

DESCRIPTION OF THE PRIOR ART

The present invention is conceived to supplement and complement existing means of providing a reduction in the transmission of vibration from the chassis of a motorcycle or tractor to the seat through the supporting members of the seat. The invention does not contemplate the reduction of large shocks, that being the function of the normal seat cushioning or springs; however, as will be evident from the following disclosure, the present invention will also dissipate the stress on structural members to some degree with respect to large shocks. The vibration absorbing pads and the relative placement thereof are contemplated to primarily reduce high frequency vibration transmitted to the seat from the motor, drive chains and sprockets which, for example, which can cause driver fatigue and discomfort.

Although numerous patents have been directed to the construction of motorcycle and tractor seats, the inventor herein knows of only one patent having relevance to the present invention, that being U.S. Pat. No. 2,303,567. This patent discloses a resilient seat mounting having two resilient rubber discs interposed between a mounting seat post and mounting seat bracket such that shocks transmitted between the post and seat are resisted, absorbed and dampened by the torsional and shear stresses inherent in the rubber compound.

The primary distinction between U.S. Pat. No. 2,303,567 and the present resilient mounting means is that the former is designed to primarily absorb for large shocks while the latter is to attenuate for high frequency vibration. In the former, high frequency vibrations from the motor drive chains, sprockets and gears may still be transmitted to the seat through the brackets attached to the seat bottom. Thus it is contended that the present invention could be applied in combination with above-cited disclosure to further improve the performance of the former invention.

The present invention may be incorporated into existing motorcycle seats inexpensively as only a slight alteration of existing parts is contemplated. The invention simply consists of a kit of pads formed from a durable rubber-like compound which interface supporting seat frame members and securing components to intercept and to interrupt the transmissability of vibration to the seat, and includes one modified seat support frame member and two bolt extensions.

SUMMARY OF THE INVENTION

The object desired to be attained by the present invention is the isolation of the seat of a motorcycle or tractor from vibration and especially, from high frequency vibration transmitted from the motorcycle or tractor chassis from the motor drive chains, sprockets and gears through a main seat support member and the other related seat support frame members. This goal is accomplished by interposing resilient rubber-type compound pads primarily between members which transmit vibration to other members which receive and further transmit the vibration to the seat. Furthermore, bolts which interconnect the supporting members are also dampened with respect to vibration transmission, by the placement of the resilient pads through which the bolts protrude.

Generally, the invention contemplates the positioning of a kit of the vibration absorbing pads between the main support bar and support members attached to the seat bottom. Resilient pads may be further positioned so the bolt head and securing nut and washer combinations will both be interfaced to the supporting members by the pads. Not all bolt/or nut-washer and support member connections need be interfaced by a resilient vibration absorbing pad, however, if the connection is not in direct relation to the transmission path of vibration to the seat and if the bolt is adequately dampened by other absorbing pads. Use of this kit, in the preferred embodiment, requires modification to one seat support frame member and two bolt extensions. This feature and further features may be more adequately related and described in regard to the following drawing and description thereof.

DESCRIPTION OF THE DRAWINGS

Figure 1:
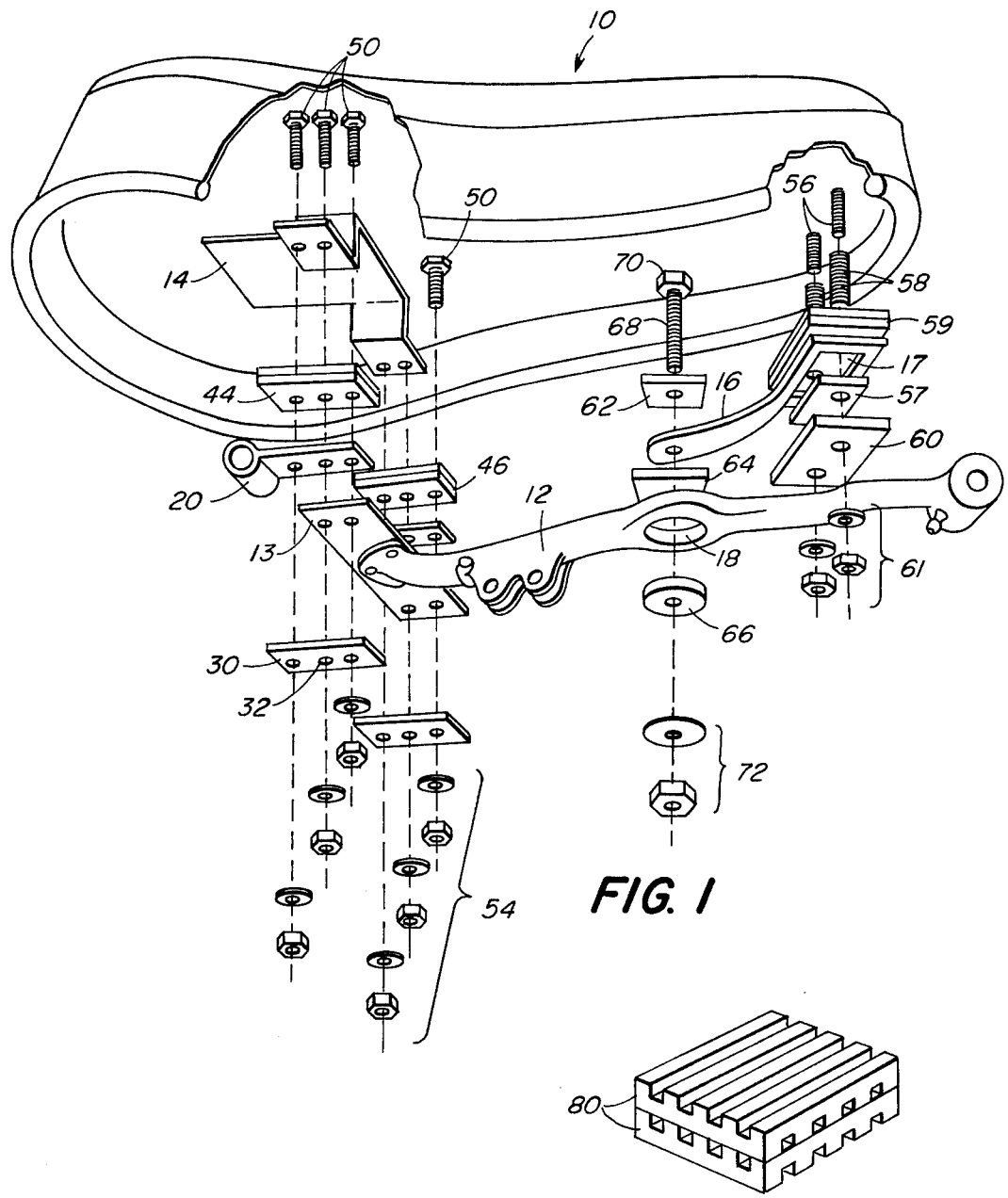
FIG. 1 illustrates an exploded perspective view of a motorcycle seat and support structure embodiment incorporating the kit of resilient vibration absorbing pads in accordance with the principles of the present invention.

Illustrated in FIG. 1 is a standard motorcycle seat 10 and its related supporting structure members as seen in a perspective exploded view, the phantom lines illustrating the relative position of the assembly members. Longitudinal T-shaped main support bar 12, which attaches at its forward extent to the motorcycle chassis, provides the main support for seat 10, its integrated rear transverse frame member 13 attaching to rear seat support flanged bracket bar 14. Flanged support bracket 14 is affixed to seat 10 or may form a unitary seat superstructure. Forward seat tongue support member 16 is angularly secured to bridge the forward seat portion to an intermediate aperture 18 on main support bar 12. Forward seat tongue support member 16 is, in the preferred embodiment, the only seat frame support member which requires modification to accommodate the kit of vibration absorbing pads. Tongue support member 16 must be enlarged at its forward extent. A rear rack attaching bracket 20 may be interposed between main support bar 12 and flanged support bracket 14.

Most of the vibrations transmitted to seat 10 will proceed from the forward portion of main longitudinal T-support bar 12 to flanged support bracket 14 due primarily to the rigidity of the connection needed to provide the main support for a rider's weight.

As a result vibration absorbing pads are placed to in effect sandwich both flat surfaces of main support 12 to reduce the vibrational level between it and the other supporting members 14 and 16 and the interconnecting bolts and nuts.

The kit of vibration absorbing pads of the present invention, of which pad 30 of FIG. 1 is an example, are dimensioned to conform in size and shape to the support member portion which the pad will abut. The pads therefore are substantially rectangular. The pads will be of a size large enough to adequately contain at least one aperture 32 of a diameter commensurate with the diameter of the securing bolt to secure a tight fit.

The rear seat support connection of flanged bracket 14 and the transverse frame member 13 of main longitudinal support bar 12 is accomplished by sandwiching said transverse member 13 between double upper absorbing pads 44 and 46 and lower absorbing pads 30 and 34. Vibration absorbing pads 44 and 46 interpose main support bar transverse frame member 13 and flanged support bracket 14, and are of a double thickness. Bolts, collectively numbered 50, extend through the assembly. Nuts and washers, collectively numbered 54, secure the assembly and abut absorbing pads 30 and 34.

It should be noted that it is not critical that vibration abosrbing pads be placed between main support bar transverse section 13 and rear rack support brackets 20 since brackets 20 do not in themselves transmit vibration to seat 10 by a rigid connection, but do transmit to the rack which supports it. However, if desired vibration absorbing pads could be placed to interpose these members.

Thus all pads, since they snuggly fit the shafts of bolts 50, act to reduce the transmission of vibration by the bolts. Together the pads reduce the vibrations incrementally with lower pads 30 and 34 initially absorbing some of the vibration. Double pads 44 and 46 act to complete the reduction of vibration transmission into and through flanged bracket 14.

Turning now to the forward seat portion, forward seat angled tongue support member 16 is a replacement and a variation of for the standard part, the changes being an enlargement of its forward end to provide for the insertion of an absorption pad within the forward end and allow two bolts 56 to pass therethrough to isolate said bolts from the tongue. Tongue support member 16, in the preferred embodiment has a rectangular shaped aperture 17 into which is inserted a vibration absorbing pad 57. Two vibration absorbing pads 59 and 60 sandwich the front end of seat support tongue 16, of which pad 59 is a double pad. Because of the thickness of pads 59 and 60, bolt-extensions 58 are used to extend bolts 56. Washers and nuts 61 complete this assembly. Two absorbing pads 62 and 64 encompass the surfaces of the rear of support tongue 16 to isolate it from bolt 68 and support bar 12. To further reduce the vibrations transmitted along main support bar 12, pad 66 conforming to the shape and diameter of aperture 18, is inserted within the aperture. This pad esspecially reduces the vibrational transmissability of securing bolt 68, which eliminates the need of placing a pad between bolt head 70 and tongue support 16. Nut and washer 72 complete this assembly. Absorbing pad 64 is especially helpful in reducing transmission to main support transverse section 13 in combination with the other two pads 62 and 66. It is further not always deemed necessary to place an absorbing pad between the nuts and washers, numbered 61, which abut tongue support 16 where it connects with seat 10. Thus if it is not desired to alter the tongue support frame member, although vibration isolation is not as effective, a pad may simply be placed between seat 10 and tongue 16.

Figure 2:
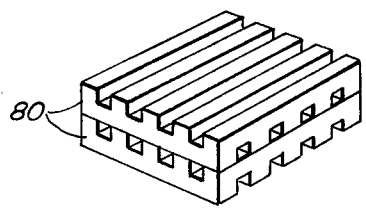
FIG. 2 is a perspective view of a typical resilient vibration absorbing pad used in the kit of this invention.

Referring now to FIG. 2, a typical vibration absorbing pad 80 is illustrated. This pad is sold under the registered trademark ISOMODE by Gilmore Industries Inc., Cleveland, Ohio. The vibration absorbing pads 80 contemplated to be used in the present invention should be rubber-like and may be constructed from neoprene for example. Their hardness should range from a static loading of 50 to 150 pounds per square inch. The pads may have flat surfaces; however, best results are obtained if the opposing surfaces have contoured ridges, each surface having the ridges running transverse to the other. The pads should have a durometer of 45.

The present invention therefore inhibits the transmission of vibrations from one supporting member to another which would be effected by direct contact of the members or through a securing bolt. The vibration absorbing pads isolate the areas which would transmit vibrations, and by placing several pads in the line of transmission, the reduction will occur incrementally. It is recognized that the present invention may be adapted to various types of motorcycle and tractor seats. The prime criteria are that all interfacing supporting members of the seats have absorbing pads interposed therein and that the pads sufficiently interrupt all direct transmission paths including bolt heads and nut attachments.

It is thus desired that the present invention not be strictly limited to the foregoing disclosure and that modifications and variations may be derived therefrom without departing from the spirit and scope of the following claims.

I claim

1. A kit of resilient absorbtion pad members of a rubber type compound to insulate a seat of a motorcycle from high frequency vibrational emanations created by the vehicle chassis and transferred to main seat support frame member attached to juxtaposed seat support frame members comprising a plurality of substantially rectangular pads dimensioned to conform to the surface area of said interconnecting juxtaposed seat support frame members abutted and interfaced by said pads, said pads positioned to interpose said seat frame members from direct contact to the interconnections thereof to interrupt and to attenuate the direct line of vibrational transmission through said juxtaposed rigid seat frame member interconnections;

apertures within said pads positioned to correspond with apertures within said juxtaposed seat frame members, to which said pads abut, dimensioned to receive snugly therethrough securing means, preferably bolts which secure said seat support frame members;

at least one contoured pad for insertion within relitively large seat support frame apertures, located a juxtaposed frame interconnections;

said contoured curved pad conforming in size and shape to said frame aperture to fit snuggly therein;

said contoured pad having at least one aperture to receive securing means therethrough, dimensioned to snugly abut said securing means;

each of said absorbing pads having two ridged surfaces, each surface having ridges running transverse to the other and having a static load of 50 to 150 pounds per square inch and a durometer reading of 45.

2. A vibration absorption kit for modification of a motorcycle seat which has a main longitudinal support frame member having an intermediately disposed aperture therein, a transverse main support frame member attached to the rear of said longitudinal frame member and a rearward flanged bracket member secured to the base of said seat comprising in combination a forward angled tongue support frame member having rectangular aperture at its forward rectangular extend to support the forward portion of said seat;

two bolt extensions for the securing of said tongue support member;

a plurality of substantially rectangular pads, each of which is dimensioned to conform to the surface area of the interconnecting juxtaposed seat support frame members abutted and interfaced by said pads, said pads positioned to interpose said seat frame members from direct contact at the interconnections thereof to interrupt and to attenuate the direct line of high frequency vibrational transmission through said juxtaposed rigid seat frame member interconnections;

a rectangular pad dimensioned to fit with in and snugly abut said rectangular aperture within said tongue;

a circular, curved pad dimensioned to fit within and snugly abut said intermediate aperture within said longitudinal main support seat frame member;

apertures within said pads positioned to correspond with apertures within said juxtaposed seat frame members, to which said pads abut, dimensioned to receive snuggly therethrough securing means, preferably bolts which secure said seat support frame members;

at least one contoured curved pad for insertion within relatively large seat support frame apertures, located at juxtaposed frame interconnections;

said contoured curved pad conforming in size and shape to said frame aperture to snugly fit therein;

said contoured curved pad having at least one aperture to receive securing means, preferably bolts, therethrough dimensioned to snugly abut said means;

and each of said resilient vibration absorbing pads having two ridged surfaces, each surface having ridges running transverse to the other and having a static load of 50 to 150 pounds per square inch and a durometer reading of 45.

3. An improved motorcycle seat frame assembly, to insolate said seat from chassis vibrations, having resilient vibration absorbing pads incorporated into a motorcycle seat and having a longitudinal main support frame member having an intermediate aperture therein, a transverse frame member attached at two points to the rearward extent of said main frame member, a flanged seat support bracket attached to the rearward extend of said seat and bolt members to attach a support frame tongue member to said seat comprising in combination:

a forward angled tongue support frame member, extending from said aperture of said main frame support to the forward extent of said seat, having a rectangular aperture at its forward rectangular extent;

a plurality of resilient pads, each of which having at least one aperture therethrough to snugly abut securing bolts;

two rectangular resilient absorbing pads, interposed between said seat and said rectangular tongue frame portion; conforming to the dimensions of said tongue rectangular portion;

a rectangular pad dimensioned to fit within and snugly abut said rectangular aperture with said tongue;

a lower resilient absorbing pad abutting the lower surface of said rectangular tongue portion;

two bolt extensions to attach to said seat bolt members to extent through said pads which sandwich said rectangular tongue frame portion and secure the same;

a circular resilient pad inserted within to snugly abut said intermediate aperture in said longitudinal main support frame member;

two rectangular resilient pads to sandwich the end of said tongue frame support member at its attachment to said longitudinal support member at said intermediate aperture;

two rearward rectangular resilient pads interposed between each of the two interconnections of said flanged bracket and said transverse main support member;

a lower rearward rectangular resilient pad to abut the lower surface of said transverse frame member at each of the two interconnections with said flanged bracket frame member to interpose said transverse frame member between resilient pads.

4. A kit of resilient vibration absorbtion pads in combination with a motorcycle seat frame having a main longitudinal support frame member having a intermediately disposed aperture therein, a transverse main support frame member attached at the rear of said longitudinal frame member, a forward angled tongue support frame member and a rearward flanged bracket frame member secured to the base of said seat further including at least one absorbing pad interposed between the juxtaposed interconnection of said angled tongue support frame member and the forward base portion of said seat;

at least two absorbing pads to sandwich said longitudinal main support frame member being coincident with said intermediately disposed aperture, one pad, the upper pad of said two pads, interposing the juxtaposed interconnection of said angled tongue frame member and said longitudinal main support frame member;

an absorbing pad inserted within said intermediately disposed aperture of said longitudinal main support frame member conforming in dimensions thereto to snugly fit therein;

at least two absorbing pads to sandwich there between each of the interfacing interconnecting surfaces of said transverse main support frame member and said flanged bracket member and at least one pad to interpose each of the two said interconnecting surfaces of the said transverse main support frame member and said flanged bracket member;

said absorbing pads abutting said frame members and interposing said frame members being conformed and dimensioned to compliment the surface area thereto; and at least one small aperture within each of said pads conforming in size and in number to the size and number of the securing members, preferably bolts which pass through said frame members to interconnect the same.

* * * * *